United States Patent
Galloway et al.

(10) Patent No.: US 9,360,884 B2
(45) Date of Patent: Jun. 7, 2016

(54) CLOCKING FOR PIPELINED ROUTING

(71) Applicant: Altera Corporation, San Jose, CA (US)

(72) Inventors: David Galloway, Toronto (CA); David Lewis, Toronto (CA); Ryan Fung, Mississauga (CA); Valavan Manohararajah, Scarborough (CA); Jeffrey Christopher Chromczak, Brownsville (CA)

(73) Assignee: Altera Corporation, San Jose, CA (US)

( * ) Notice: Subject to any disclaimer, the term of this patent is extended or adjusted under 35 U.S.C. 154(b) by 403 days.

(21) Appl. No.: 14/075,802

(22) Filed: Nov. 8, 2013

(65) Prior Publication Data

US 2015/0134870 A1    May 14, 2015

(51) Int. Cl.
*G06F 13/34* (2006.01)
*G06F 1/10* (2006.01)
*G06F 1/08* (2006.01)

(52) U.S. Cl.
CPC .... *G06F 1/10* (2013.01); *G06F 1/08* (2013.01)

(58) Field of Classification Search
CPC .......................................................... G06F 1/08
USPC ......................................................... 710/306
See application file for complete search history.

(56) References Cited

U.S. PATENT DOCUMENTS

| | | | |
|---|---|---|---|
| 5,911,063 A | 6/1999 | Allen et al. | |
| 6,630,842 B1 | 10/2003 | Lewis et al. | |
| 6,965,249 B2 | 11/2005 | Lane et al. | |
| 7,627,003 B1 | 12/2009 | Fouts et al. | |
| 7,911,240 B1 * | 3/2011 | Lai | G06F 1/10 327/298 |
| 9,021,323 B1 * | 4/2015 | Dastidar | G01R 31/318541 714/727 |
| 9,030,253 B1 * | 5/2015 | Ngai | H01L 25/00 327/564 |
| 2004/0095165 A1 * | 5/2004 | Itoh | G06F 1/06 327/99 |
| 2004/0193981 A1 | 9/2004 | Clark et al. | |

FOREIGN PATENT DOCUMENTS

DE      19950360      4/2001

OTHER PUBLICATIONS

Vanderhoek, U.S. Appl. No. 13/630,925, filed Sep. 28, 2012.

\* cited by examiner

*Primary Examiner* — Titus Wong

(57) ABSTRACT

An integrated circuit may have pipelined programmable interconnects that are configured to select between a routing signal stored in a register and the identical routing signal bypassing the register. The pipelined programmable interconnect may send the selected routing signal over a wire to the next pipelined programmable interconnect circuitry. The integrated circuit may also have clock routing circuitry to select respective clock signals for the registers in the different pipelined programmable interconnects. The clock routing circuitry may include first interconnects that convey region clocks, second interconnects that conveys routing clocks, a first selector circuit to select routing clocks among the region clocks, and a second selector circuit to select routing clocks for the respective registers.

24 Claims, 14 Drawing Sheets

CLOCKING FOR PIPELINED ROUTING

BACKGROUND

This invention relates to integrated circuits and, more particularly, to pipelined interconnect circuitry arid the clocking of pipelined interconnect circuitry on an integrated circuit.

Every transition from one technology node to the next technology node has resulted in smaller transistor geometries and thus potentially sore functionality implemented per unit of integrated circuit area. Synchronous integrated circuits have further benefited from this development as evidenced by reduced interconnect and cell delays, which have led to performance increases. However, more recent technology nodes have seen a significant slow-down in the reduction of delays (i.e., a slow-down in the performance increase).

To further increase the performance, solutions such as register pipelining have been proposed, where additional registers are inserted between synchronous elements, thereby increasing latency for the benefit of increased clock frequencies and throughput. However, performing register pipelining often involves spending significant time and effort because several iterations of locating performance bottlenecks, inserting and removing registers, and compiling the modified integrated circuit design are usually required.

Situations frequently arise where a register pipelined integrated circuit design still exhibits an unsatisfactory performance after many iterations of inserting and removing registers because synchronous elements are placed far from each other and existing routing architectures don't support a high speed connection across the integrated circuit in an efficient manner.

SUMMARY

In accordance with certain aspects of the invention, an integrated circuit may have programmable routing resources that include a pipelined programmable interconnect coupled between a wire and multiple wires. The pipelined programmable interconnect may be configured to select and route one of the multiple wires to a register and from the register to the wire. The integrated circuit may also have clock routing circuitry that includes a first set of interconnects that conveys first clock signals, a second set of interconnects that conveys second clock signals, a selector circuit coupled between the first and second set of interconnects, and a multiplexer coupled between the second set of interconnects and the register. The selector circuit may receive the first clock signals and select among the received first set of clock signals to produce the second clock signals. The multiplexer may receive the second clock signals, select a signal among the second clock signals, and provide the selected signal to the register.

It is appreciated that the present invention can be implemented in numerous ways, such as a process, an apparatus, a system, a device, or a method on a computer readable medium. Several inventive embodiments of the present invention are described below.

In certain embodiments, the above-mentioned selector circuit may have a plurality of multiplexers, and each of these multiplexers may produce a respective one of the second plurality of clock signals.

If desired, the pipelined programmable interconnect may include an additional register, and an additional multiplexer coupled between the second set of interconnects and the additional register. The additional multiplexer may receive the second clock signals, select a signal among the second clock signals, and provide the selected signal to the additional register.

Further features of the invention, its nature and various advantages, will be more apparent from the accompanying drawings and the following detailed description of the preferred embodiments.

DETAILED DESCRIPTION

The present invention relates to integrated circuits and, more particularly, to pipelined interconnect circuitry and the clocking of pipelined interconnect circuitry in an integrated circuit.

As the functionality implemented per unit of die area continues to increase, it becomes increasingly challenging for existing routing architectures to support a high speed connection across the die. Thus, situations frequently arise where the critical path between sequential elements spans a large distance across the die.

It may therefore be desirable to improve the routing architecture by facilitating the use of register pipelining techniques, for example by including pipeline registers into the interconnection circuitry and providing corresponding clock selection circuitry.

It will be recognized by one skilled in the art, that the present exemplary embodiments may be practiced without some or all of these specific details. In other instances, well-known operations have not been described in detail in order not to unnecessarily obscure the present embodiments.

Figure 1:
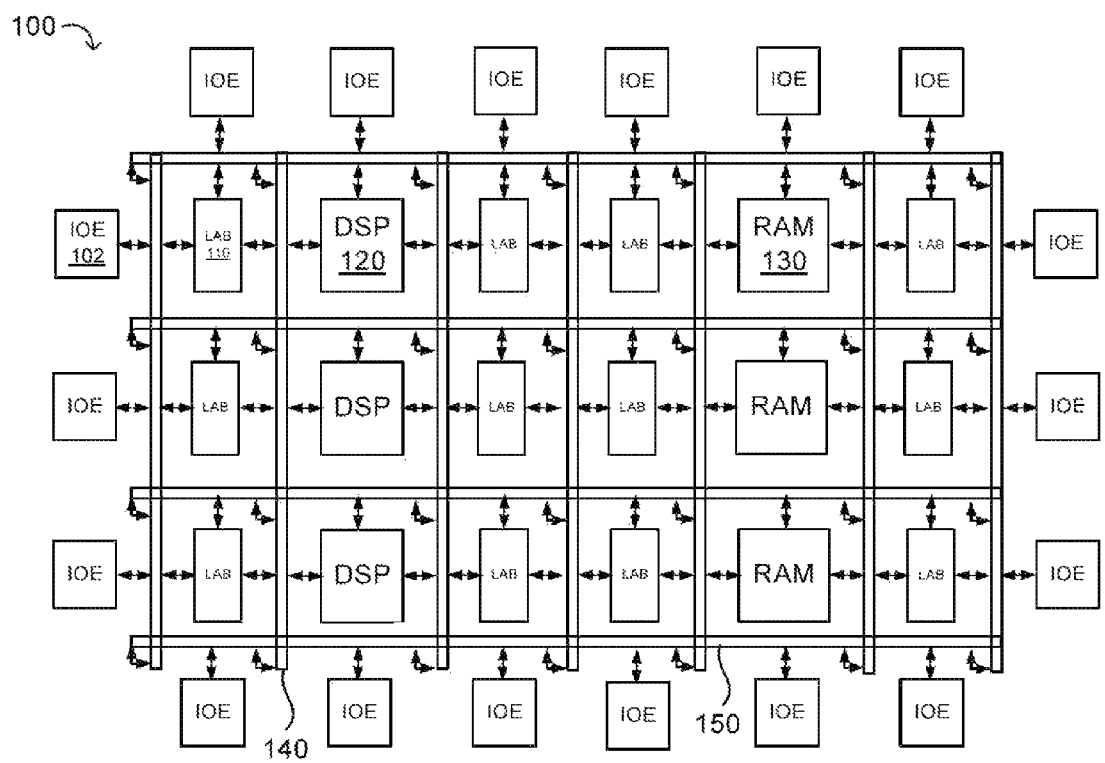
FIG. 1 is a diagram of an illustrative integrated circuit having an exemplary routing topology in accordance with an embodiment of the present invention.

An illustrative embodiment of an integrated circuit such as programmable logic device (PLD) 100 having an exemplary routing topology is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. The PLD may also include programmable interconnect in the form of vertical routing channels 140 and horizontal routing channels 150, each routing channel including one or more routing wires.

In addition, the programmable logic device may have input/output elements (IOEs) 102 for driving signals off of PLD and for receiving signals from other devices. Input/output elements 102 may include parallel input/output Circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

Routing wires may be shorter than the entire length of the routing channel. A length n wire may span n functional blocks. For example, a length four wire may span four blocks. Length four wires in a horizontal routing channel may be referred to as "H4" wires, whereas length four wires in a vertical routing channel may be referred to as "V4" wires.

Different routing architectures may have functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1½-sided, 2-sided, and 4-sided routing: architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing wire topologies, besides the topology depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments of the present invention may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
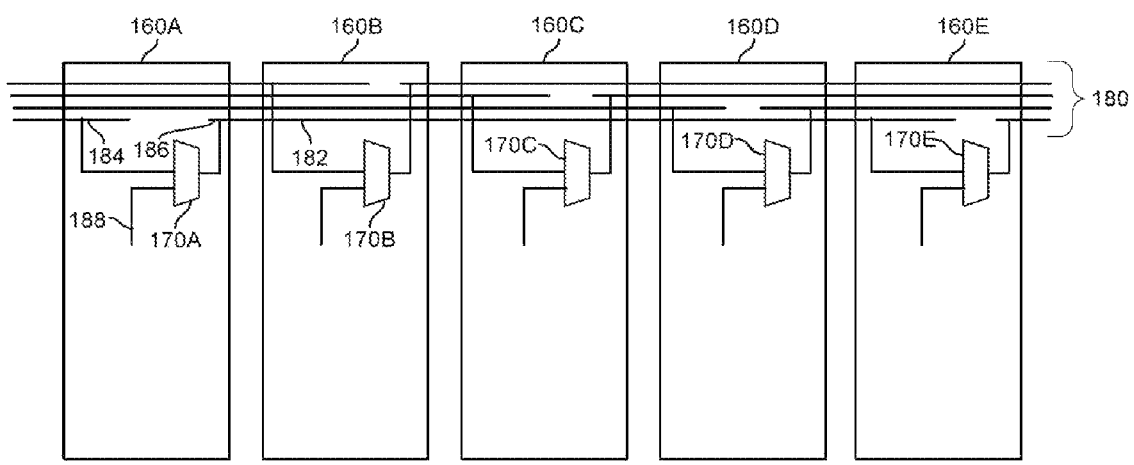
FIG. 2 is a diagram of an illustrative direct drive routing channel with staggered wires in accordance with an embodiment of the present invention.

FIG. 2 shows such a direct drive horizontal routing channel 180 across functional blocks 160. Each functional block 160 may have a driver (not shown) to drive a signal on a wire that starts in the respective functional block (e.g., wire 186). Each driver may be associated with a multiplexer such as multiplexer 170. For example, multiplexer 170A may be configured to select a signal to drive on wire 186, and multiplexer 170A may be configured to select a wire that ends in the respective functional block (e.g., wire 184). Connecting a wire that ends in a functional block to a wire that starts in that identical functional block is sometimes also referred to as "wire stitching" or stitching. If desired, multiplexer 170A may be configured to select a signal from a different wire. For example, multiplexer 170A may select a signal from a wire driven by a block within functional block 160A. Multiplexer 170A may also select a signal from a wire in another routing channel such as a signal from a wire in a vertical routing channel that ends in the respective functional block (not shown).

As shown, each wire of routing channel 180 is unidirectional from left to right and has a length of four. In other words, a wire that starts in functional block 160A will end in the functional block 160E. Routing channel 180 as shown also has different wires that start and end in different functional blocks 160 and thus may be stitched in the respective functional block. For example, the top most wire may be stitched in functional block 160B, the second top most wire may be stitched in functional block 160C, etc. An arrangement in which different wires from the same routing channel may be stitched together in different functional blocks is sometimes also referred to as staggered wiring or a routing channel with staggered wires.

Figure 3A:
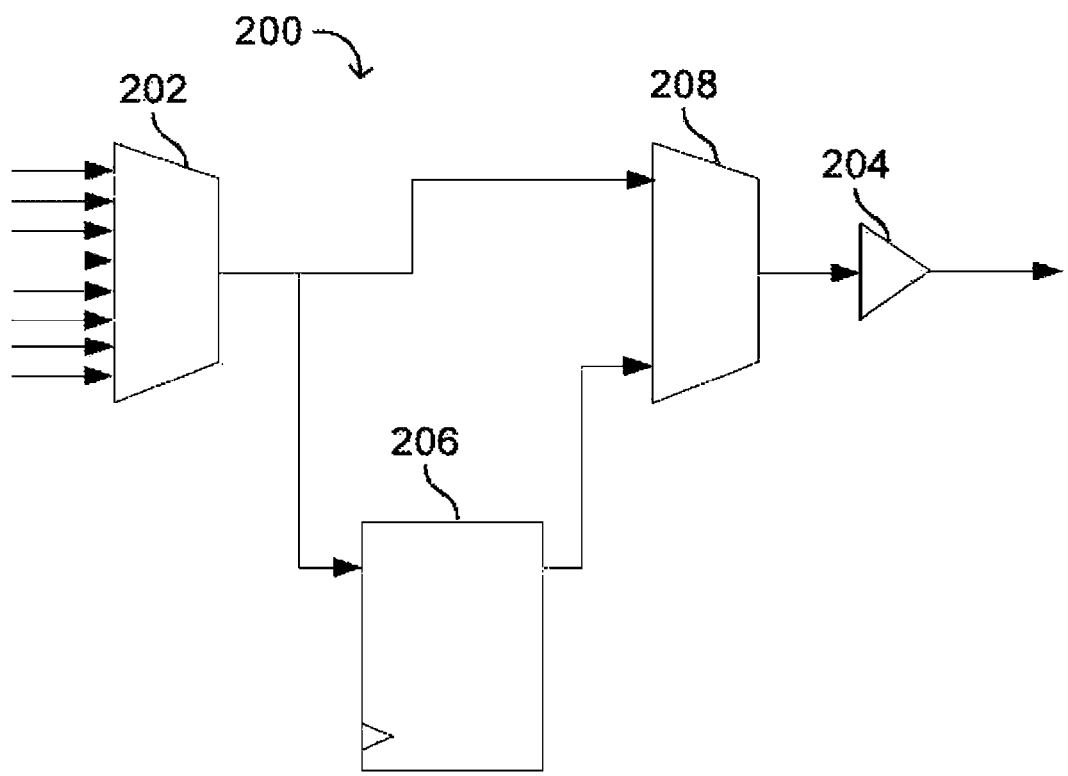
FIG. 3A is a diagram of an illustrative pipelined routing resource which uses a register to pipeline a routing signal in accordance with an embodiment of the present invention.

FIG. 3A depicts a pipelined routing resource 200 which uses a register in accordance with an embodiment of the invention. As shown, the pipelined routing resource 200 includes a first multiplexer 202, a driver 204, a register 206, and a second multiplexer 208.

Multiplexer 202 may be a driver input multiplexer (DIM) or a functional block input multiplexer (FBIM). A DIM drives a routing wire and may select from multiple sources that can drive the wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3A, in accordance with an embodiment of the invention, the multiplexer 202 may be pipelined by providing its output to the data input of register 206. Multiplexer 208 in the pipelined routing resource 200 may receive the output of multiplexer 202 directly and may also receive the data output from register 206. Multiplexer 208 may enable pipelined routing resource 200 to be either used in a non-pipeline mode or in a pipeline register mode. In the non-pipeline mode, the output of multiplexer 208 selects the direct output of multiplexer 202. In the pipeline mode, multiplexer 208 may select the output of register 206. Multiplexer 208 may provide its output to driver circuit 204, and the output of driver circuit 204 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 206 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constraint to operate with a 650 ps clock cycle. Thus, providing a pipeline register such as register 206 every fourth wire may be sufficient in this example. Alternatively the registers may be placed more frequently than every fourth wire (e.g., every second wire) to provide a higher degree of freedom in selection of which registers are used.

In one embodiment, the pipelined wires may be placed in a periodic manner. For instance, some fixed number of conventional DIMs may be followed by a pipelined DIM (PDIM) in a periodic manner. Consider, for example, a routing architecture with 320 horizontal (H) wires and 160 vertical (V) wires, each of length 4, and a total of 80 drivers per functional block. In order to register one-fourth of the wires, it would be necessary to provide 320/4/4 PDIMs=20 PDIMs for the H wires and 160/4/4 PDIMs=10 PDIMs for the V wires in each functional block. Note that the fraction of wires pipelined may vary for different wire types. For example, if V wires take 300 ps to traverse, it would be desirable to pipeline at least one-half of them to meet a 650 ps timing budget.

Figure 3B:
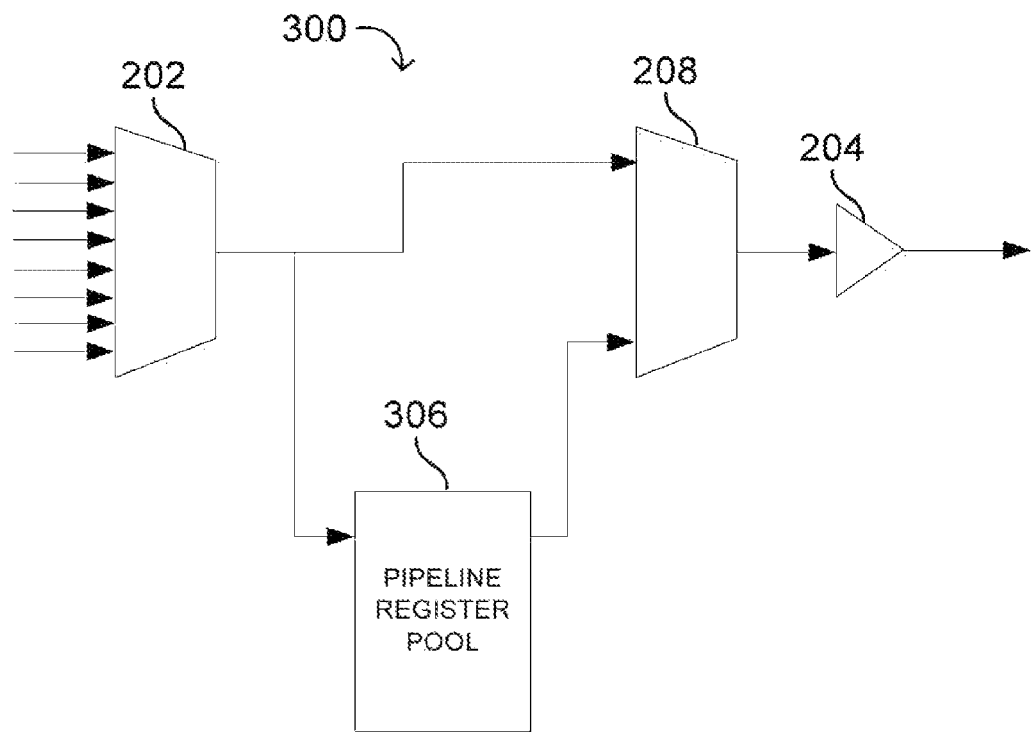
FIG. 3B is a diagram of illustrative pipelined routing resource which uses a register pool to pipeline a routing signal in accordance with an embodiment of the present invention.

While FIG. 3A shows an embodiment that integrates a register such as register 206 with an individual multiplexer 202, FIG. 3B depicts an embodiment of pipelined routing resource 300 where an individual multiplexer 202 may use a register from a common pool of pipeline registers 306. In accordance with this embodiment, the common pool of pipeline registers may be shared in a selective manner by some set of DIM/FBIMs. In other words, each multiplexer 202 that is to be made capable of pipelining is arranged to provide an output to the pipeline register pool 306, and from an output of the pipeline register pool 306 to multiplexer 208. Pipeline register pool 306 may include an input selector circuit and an output selector circuit. The input selector circuit may receive the outputs from multiple multiplexers 202 and selectively couple individual multiplexers 202 to registers for pipelining.

The output selector circuit may receive signals from multiple registers and selectively couple the register that stores the signal coming from the respective multiplexer 202 with the corresponding multiplexer 208.

Figure 4:
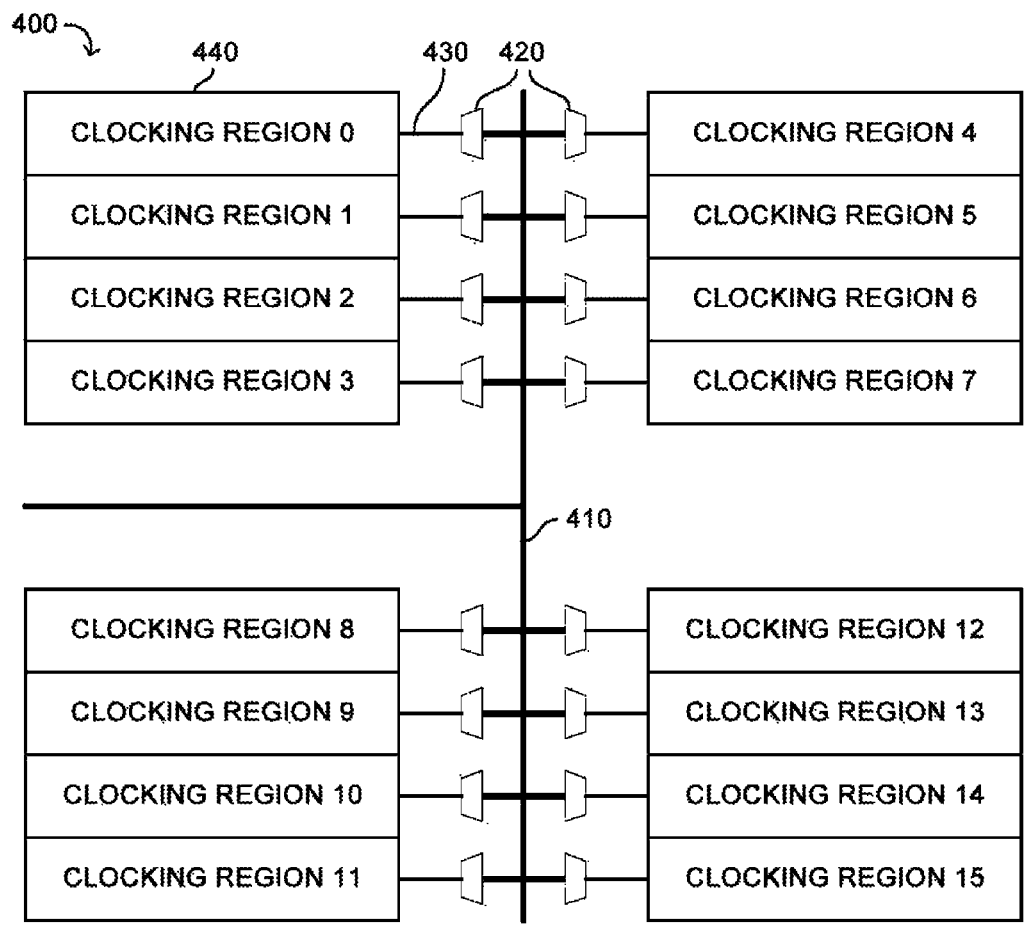
FIG. 4 is a diagram of illustrative clock tree with clock selection circuitry to select and route clock signals into clocking regions in accordance with an embodiment of the present invention.

Each register in a pipelined routing resource and each register in a pipeline register pool may be synchronized to a given clock signal. FIG. 4 shows an illustrative clock distribution network 400. Such a clock distribution network is sometimes also referred to as a clock tree, although other topologies such as meshes are also possible. Clock tree 400 distributes one or more clock signals from a common point in the integrated circuit where the respective clock signal is generated or enters the integrated circuit (e.g., from a phase-locked loop circuit or an input pin) to all sequential elements in the integrated circuit that are synchronized by the respective clock signal. Hence, a clock tree may be used to meet requirements, such as minimum skew (i.e., the difference in time in which a rising edge of a clock signal arrives at different sequential elements in the synchronous circuit) or minimum latency (i.e., the time for a given clock signal from the common point to any sequential element in the integrated circuit) to avoid failure of the integrated circuit.

Clock tree 400 may have clock distribution channel 410 which may convey multiple clock signals to a set of multiplexers 420. Multiplexers 420 may each select a different subset of clock signals from among the multiple clock signals and provide the selected subsets of clock signals over clock region wires 430 to the different clocking regions 440.

Consider the scenario in which a circuit design having multiple clock domains is implemented in an integrated circuit. Consider further that the circuit design implementation has a path that connects sequential elements that are synchronized by a particular clock signal from a given clock domain using the pipelined routing resource. In this scenario, the registers in the pipelined routing resources that connect the sequential elements mentioned above may be synchronized by the identical clock signal that synchronizes the sequential elements linked by the path. However, the sequential elements may be implemented far apart, and the path may cross regions that use clock signals from different clocks domains. As an example, in FIG. 4, the source of the path may be located in clocking region 11, while the destination of the path is located in clocking region 4. It may therefore be desirable to carefully design the clock tree with pipelined routing resources in mind. Further clock selection circuitry may be required to provide a given clock signal to a pipelined routing resource which may require clocking of the pipeline register (e.g., register 206 in FIG. 3A) by the given clock signal.

Figure 5:
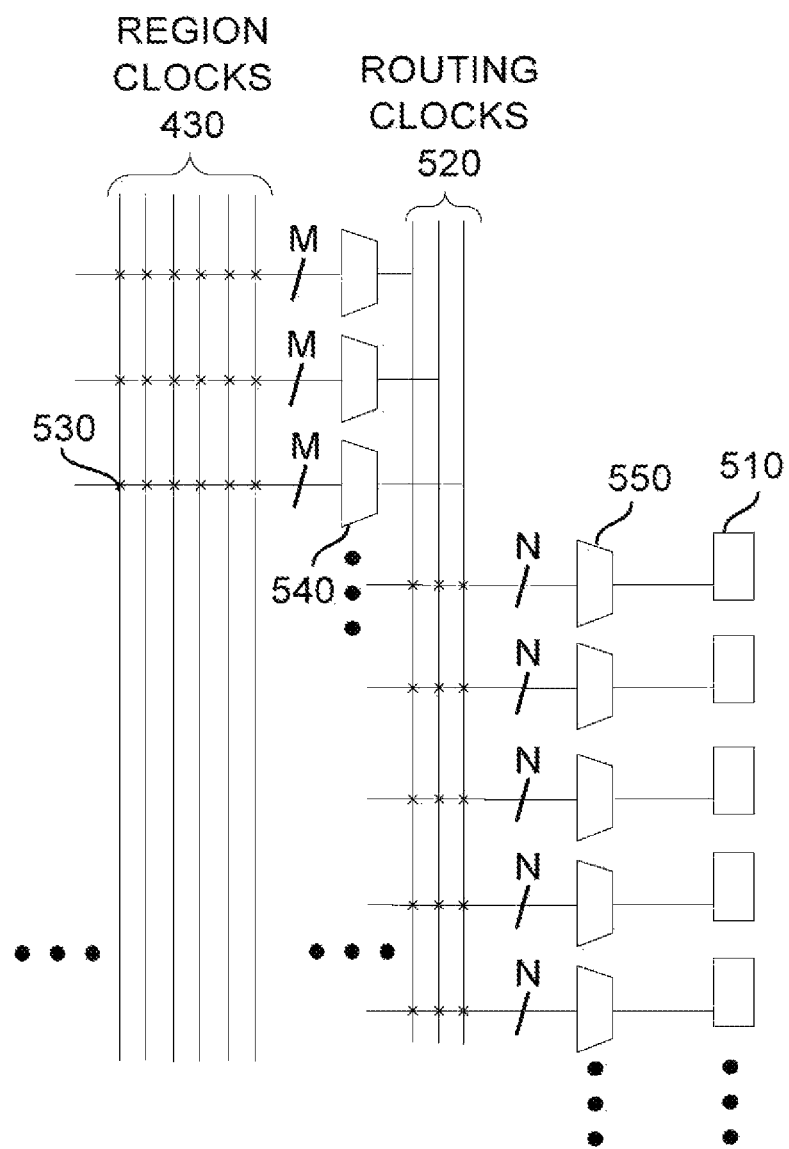
FIG. 5 is a diagram showing illustrative clock selection circuitry for pipelined routing resources in which each pipelined routing resource may select from all routing clocks in accordance with an embodiment of the present invention.

FIG. 5 shows illustrative clock selection circuitry for registers in a pipeline register pool (e.g., pipeline register pool 306 of FIG. 3B) or for individual registers in pipelined routing resources (e.g., pipeline register 206 of FIG. 3A) in which each register may select from all routing clocks. Consider the scenario in which a given clocking region has M region clocks 430. In this scenario, a first clock selection stage 540 may have N M:1 multiplexers, where N is less than or equal to M. Each of the N M:1 multiplexers may receive all M region clocks (e.g., through connections 530) and produce exactly one of the N routing clocks 520. The H routing clocks 520 carry a strict subset of the M region clocks in the event that N is less than M.

As shown in FIG. 5, each register 510 in a pipeline register pool or in a pipelined routing resource may receive one clock signal from a respective second clock selection stage 550. Clock selection stage 550 may have one N:1 multiplexer for each register 510. Thus, every register 510 may receive any one of the H routing clocks 520.

Among routing clocks 520, a given clock signal may be used much more frequently than the other clock signals. For example, a clock signal connected to a large portion of sequential elements in the integrated circuit may also require many pipelined routing resources. In comparison, other clock signals, such as clock signals related to sequential elements that are placed outside of a given region and linked by paths crossing through that region, may be used much less frequently by pipelined routing resources within that given region.

Figure 6:
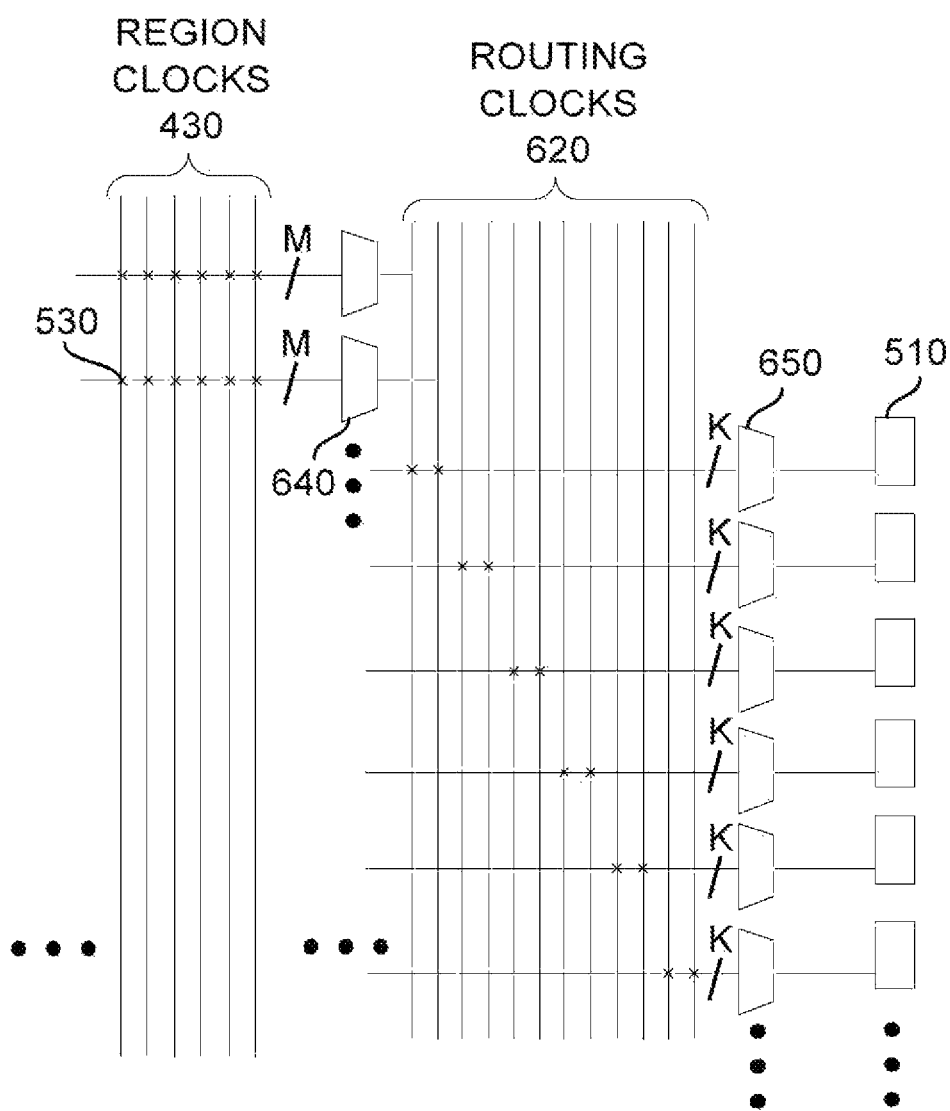
FIG. 6 is a diagram showing illustrative clock selection circuitry for pipelined routing resources in which two distinct routing clocks carry an identical region clockand in which each pipelined routing resource selects from a subset of routing clocks in accordance with an embodiment of the present invention.

An embodiment of clock selection circuitry in which registers in a pipeline register pool or in pipelined routing resource may have access to an increased number of region clocks while simultaneously limiting the number of routing clocks that each pipelined routing resource has access to is shown in FIG. 6.

As shown in FIG. 6, a given clocking region has M region clocks 430. A first clock selection stage 640 may have N M:1 multiplexers with M is less than or equal to N. Each of the N M:1 multiplexers may receive all M region clocks (e.g., through connections 530) and produce exactly one of the H routing clocks 620. In the event that M is less than N, at least two of the N routing clocks may carry the identical clock signal. Each register 510 may receive one clock signal from a second clock selection stage 650. Clock selection stage 650 may have one K:1 multiplexer for each register 510 with K is less than or equal to N. Thus, every register 510 may receive only a subset of the N routing clocks 620 if K is less than N.

In this configuration, region clocks 430 may be selected by the first clock selection stage 640 in relation to their usage by the pipelined routing resources 510, so that clock signals that are used by many pipelined routing resources are provided on more routing clocks 620. Thus, K:1 multiplexers with K less than N may be provided in the second clock selection stage 650, while still providing access to a larger member of distinct clock signals in total, in relation to the relative demand for each clock signal.

Figure 7:
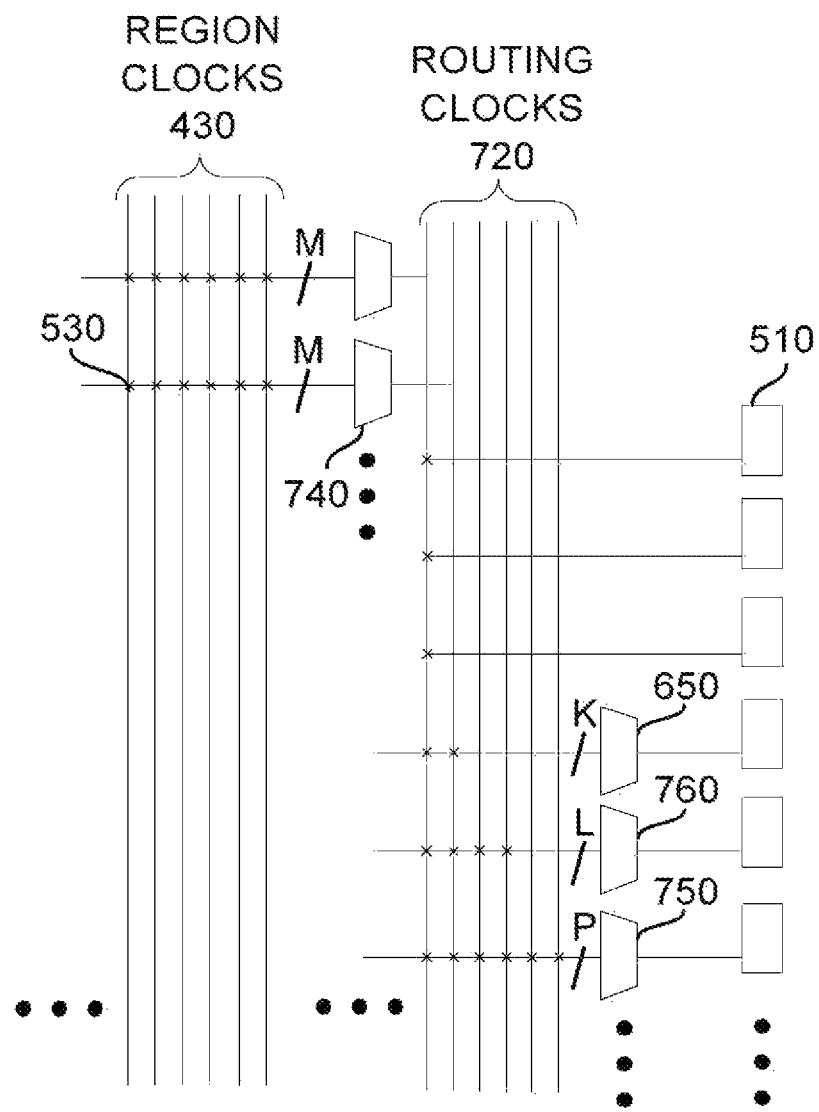
FIG. 7 is a diagram showing illustrative clock selection circuitry for pipelined routing resources in which two different pipelined routing resources select from two different subsets of routing clocks in accordance with an embodiment of the present invention.

The embodiment of clock selection circuitry shown in FIG. 7 may further exploit the observation that the clock signal use in an integrated circuit may be skewed. As shown in FIG. 7, a given clocking region has M region clocks 430. A first clock selection stage 740 may have P M:1 multiplexers. Each of the P M:1 multiplexers may receive all M region clocks (e.g., through connections 530) and produce exactly one of the P routing clocks 720. At least some of registers 510 may receive one clock signal from a second clock selection stage. The second clock selection stage may have heterogeneous selection circuitry. For example, some pipelined routing resources may connect to exactly one of the routing clocks 720 without the capacity to choose. Other pipelined routing resources may have access to K, L, or P routing clocks through K:1 multiplexers 650, L:1 multiplexers 760, or P:1 multiplexers 750 with K<L<P.

In this configuration, region clocks 430 may be selected by the first clock selection stage 740 in relation to their usage by the pipelined routing resources 510. For example, clock signals that are used by most pipelined routing resources are provided on those routing clocks 720 that have direct connections to pipelined routing resources 510. Similarly, the K:1 multiplexers may have access to the K most used clock signals, while the L:1 multiplexers have access to the L most used clock signals, and the P:1 multiplexers have access to all clock signals conveyed on routing clocks 720.

The number of pipelined routing resources having direct connections, K:1 T multiplexers 650, L:1 multiplexers 760, and P:1 multiplexers in the second clock selection stage may decrease with an increase in access to routing clocks. For example, there may be more direct connections than K:1 multiplexers, more K:1 multiplexers than L:1 multiplexers, and more L:1 multiplexers than P:1 multiplexers.

Other configurations are possible as well. For example, K:1 multiplexers 650 and L:1 multiplexers 760 may have access to disjoint subsets of routing clocks. The number of multiplexers having different access to routing clocks may be increased. For example, the second clock selection stage may additionally have S:1 multiplexers and T:1 multiplexers with K<S<L<T<P. Alternatively, the number of multiplexers having access to different routing clocks may be decreased. For example, the second clock selection stage may only have K:1 multiplexers and P:1 multiplexers. An embodiment of such a clock selection circuit is shown in FIG. 8.

Figure 8:
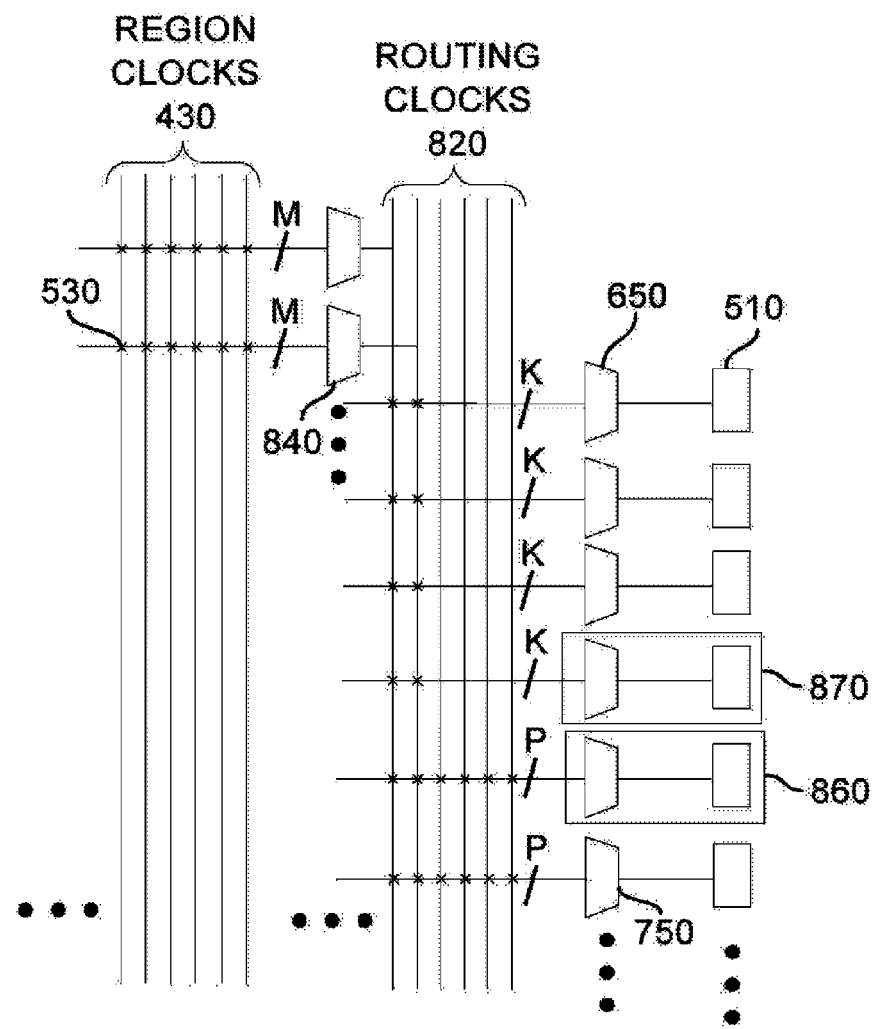
FIG. 8 is a diagram showing illustrative clock selection circuitry for pipelined routing resources in which two different subsets of pipelined routing resources select from two different subsets of routing clocks in accordance with an embodiment of the present invention.

As shown in FIG. 8, a given clocking region has M region clocks 430. A first clock selection stage 840 may have P M:1 multiplexers. Each of the P M:1 multiplexers may receive all M region clocks (e.g., through connections 530) and produce exactly one of the P routing clocks 820.

As shown in FIGS 5, 6, 7, and 8, each multiplexer in the respective first clock selection stages (i.e., in first clock selection stages 540, 640, 740, and 840) has access to all region clocks through connections 530 and M:1 multiplexers. Other configurations may have D:1 multiplexers (not shown) with D<M that may select from a subset of region clocks only. If desired, the first clock selection stage may include any configuration of different multiplexer's (e.g., F:1 multiplexers in addition to D:1 and M:1 multiplexers) having access to different subsets of region clocks 430. Those different subsets of region clocks 430 may be disjointed. Alternatively, the different subsets of region clocks to which the different multiplexers in the first clock selection stage have access to may be overlapping or being subsets of each other. Some region clocks may have a wired direct connection to a routing clock.

Each register 510 in FIG. 8 may receive one clock signal from a second clock selection stage. The second clock selection stage may have heterogeneous selection circuitry. Pipelined routing resources may have access to K or P routing clocks through K:1 multiplexers 650 or P:1 multiplexers 750 with K<P.

The second clock selection stage may be folded into the respective pipeline register pool or pipelined routing resource as illustrated by blocks 870 and 860, which may include a register 510 together with a K:1 multiplexer 650 or a F:1 multiplexer 750, respectively.

The routing architecture may be designed in conjunction with the clock selection circuitry in an effort to reduce the cost associated with providing the clock signals to the pipelined routing resources while achieving an increased performance. As an example, it may be desirable to only provide registers in some fraction of the pipelined routing resources. For instance, the integrated circuit may exhibit sufficient performance with a register in every other or in every fourth pipelined routing resource. In this scenario, only those pipelined routing resources that actually include a register also require a second clock selection stage.

Consider the scenario in which the integrated circuit has horizontal and vertical routing channels with wires of different length. In this scenario, the pipelined routing resources may be partitioned into groups such that all routing resources of some particular type share the same set of routing clocks. For example, an integrated circuit may contain horizontal routing channels with wire lengths or three (H3), six (H6), and 20 (H20), and vertical routing channels with wire lengths of four (V4) and 12 (V12). In one example, ail routing channels with short wires (i.e., H3, H6, and V4) may share one set of routing clocks, and all routing channels with long wires (i.e., H20 and V12) may share a different set of routing clocks. In another example, horizontal routing channels with short wires (i.e., H3 and H6) may share one set of routing clocks and vertical routing channels with short wires (i.e., V4) may share another set of routing clocks. Similarly, left going horizontal routing channels may have access to a different set of routing clocks than right going horizontal routing channels, and up going vertical routing channels may have access to a different set of routing clocks than down going vertical routing channels.

The use of clock signals in an integrated circuit may be disproportionate. Some clock signals may be used very frequently, while others are only used sparsely. The use of clock signals may also vary by region. For example, a first clock signal may be dominantly used in the lower left quadrant of an integrated circuit, while a second clock signal is dominantly used in all other regions of the integrated circuit. Pipelined routing resources that are on paths that traverse a region may predominantly require access to clock signals which are used less frequently within that particular region, and thus may require access to more routing clocks. Similarly, pipelined routing resources that are on paths within a region may predominantly require access to clock signals which are used very frequently within that particular region, and thus may require access to less routing clocks.

Figure 9:
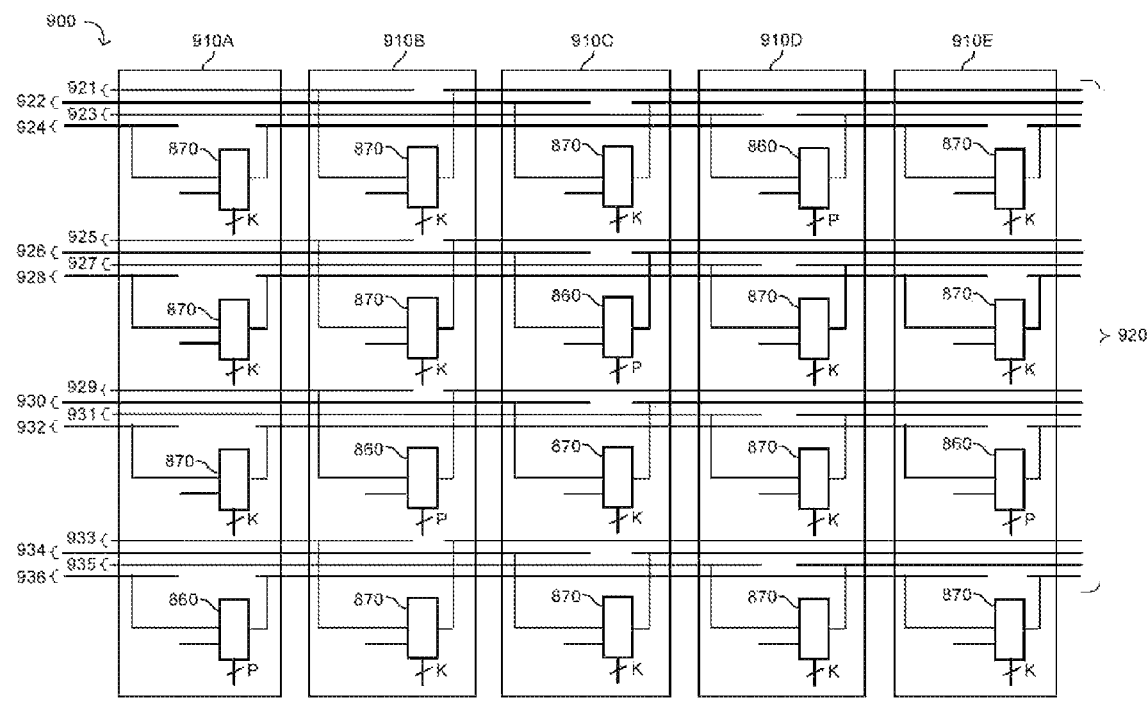
FIG. 9 is a diagram showing an illustrative routing channel with pipelined routing resources and clock selection, circuitry of the type shown in FIG. 8 in accordance with an embodiment of the present invention.

FIG. 9 shows an illustrative horizontal routing channel 920 with pipelined routing resources. As shown, horizontal routing channel 920 includes 16 staggered routing tracks 921 to 936 of length four. Every functional block 910 may have four pipelined routing resources, each driving onto one of the 16 horizontal tracks. In other words, 12 wires of the horizontal routing channel 920 cross over a given functional block (e.g., wires in tracks 921, 922, 923, 925, 926, 927, 929, 930, 931, 933, 934, and 935 cross over functional block 910A), four wires end and start in a given functional block (e.g., wires in tracks 924, 928, 932, and 936 end in functional block 910A and other wires in these same tracks are driven by pipelined routing resources 860 and 870 in functional block 910A).

Pipelined routing resources in functional block 910B drive wires in tracks 921, 925, 929, and 933, those in functional block 910C drive wires in tracks 922, 926, 930, and 934, those in functional block 910D drive wires in tracks 923, 927, 931, and 935, and those in functional blocks 910A and 910E drive wires in tracks 924, 928, 932, and 936.

Every pipelined routing resource may receive signals from horizontal wires that end in the current functional block and signals produced by the functional block. Additionally, pipelined rooting resources may receive signals from other resources as well. For example, pipelined routing resources may receive signals from vertical routing channels or diagonal routing channels.

In the example of FIG. 9, every functional block may have one pipelined routing resource 860 and three pipelined routing resources 870. Pipelined routing resource 860 may have access to all P routing clocks by having a P:1 multiplexer in the second clock selection stage, while pipelined routing resource 870 only has access to a subset of K routing clocks with K<P by having a K:1 multiplexer in the second clock selection stage. With this particular configuration, one fourth of the horizontal tracks may have access to all P routing clocks at every wire, half of the horizontal tracks may have access to all P routing clocks every second wire, or all horizontal tracks may have access to all P routing clocks every fourth wire, or any combination thereof in which case some horizontal tracks may not have access to all P clocks at all.

Thus, long distance connections that travel through other regions may have access to a large number of clocks, while local connections in a region have access to a smaller set of clocks that are used in that region.

The choice of one pipelined routing resource 860 and three pipelined routing resources 870 per functional block and the resulting access limitation, to clock signals is merely illustrative. If desired, each functional block may have two pipelined, routing resources 860 and two-pipelined routing resources 870, three pipelined routing resources 860 and one pipelined routing resource 860, or only pipelined routing resources 860, just to name a few alternatives.

As shown in FIG. 9, all horizontal tracks 921 to 936 may have access to all P routing clocks every four wires. For example, horizontal track 936 may have access to all P routing clocks in functional block 910A, whereas horizontal tracks 929, 926, 923, and 932 may have access to all P routing clocks in functional blocks 910B, 910C, 910D, and 910E, respectively. The configuration in which all horizontal tracks may have access to all P routing clocks every four wires is further illustrated in FIG. 10, which shows the same configuration of a horizontal routing channel 920 with pipelined routing resources as shown in FIG. 9. Horizontal routing channel 920 includes 16 staggered routing tracks of length four. Every functional block 910A-910Z may have four pipelined routing resources, each driving one of the wires of the 16 horizontal tracks. In other words, 12 wires cross over a given functional block (e.g., wire 1022), four wires end in a given functional block (e.g., wire 1028), and four wires start in a given functional block (e.g., wire 1024).

Figure 10:
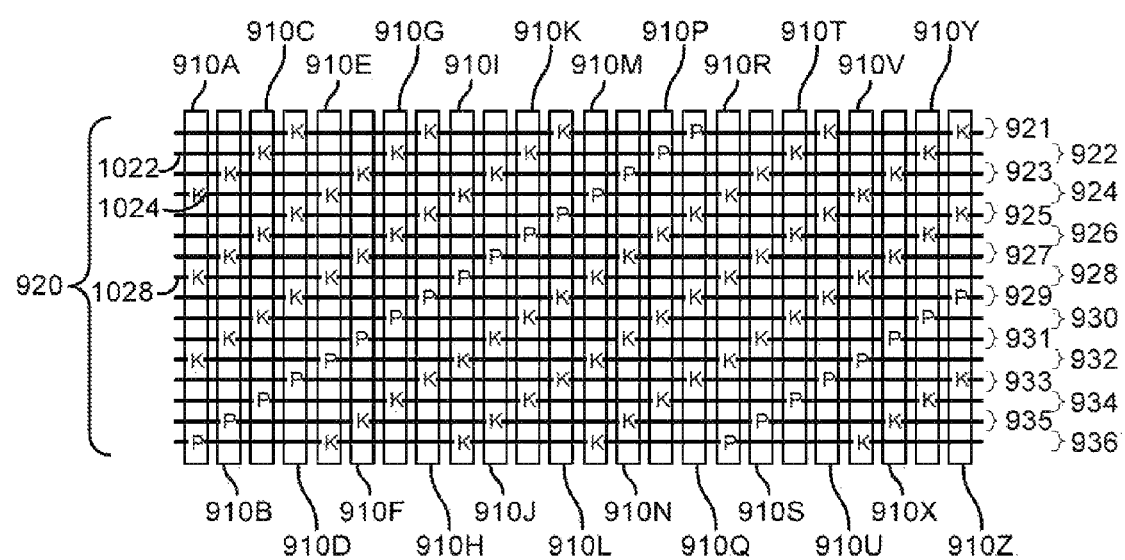
FIG. 10 is a diagram showing the illustrative routing channel of FIG. 9 with pipelined routing resources in each routing track having access to at least some clock signals in every four wires in accordance with an embodiment of the present invention.

The letters P and K denominate pipelined routing resources having access to P and K clock signals in the second clock selection stage, respectively. As shown in FIG. 10, horizontal track 936 (i.e., the track at the bottom of routing channel 920 in FIG. 9) may have access to all P routing clocks in functional blocks 910A and in 910R, while only K routing clocks are accessible in functional blocks 910E, 910I, 910M, and 910V. Similarly, horizontal track 935 may have access to all P routing clocks in functional blocks 910B and 910S, while only K routing clocks are accessible in functional blocks 910F, 910J, 910N, and 910X.

Figure 11:
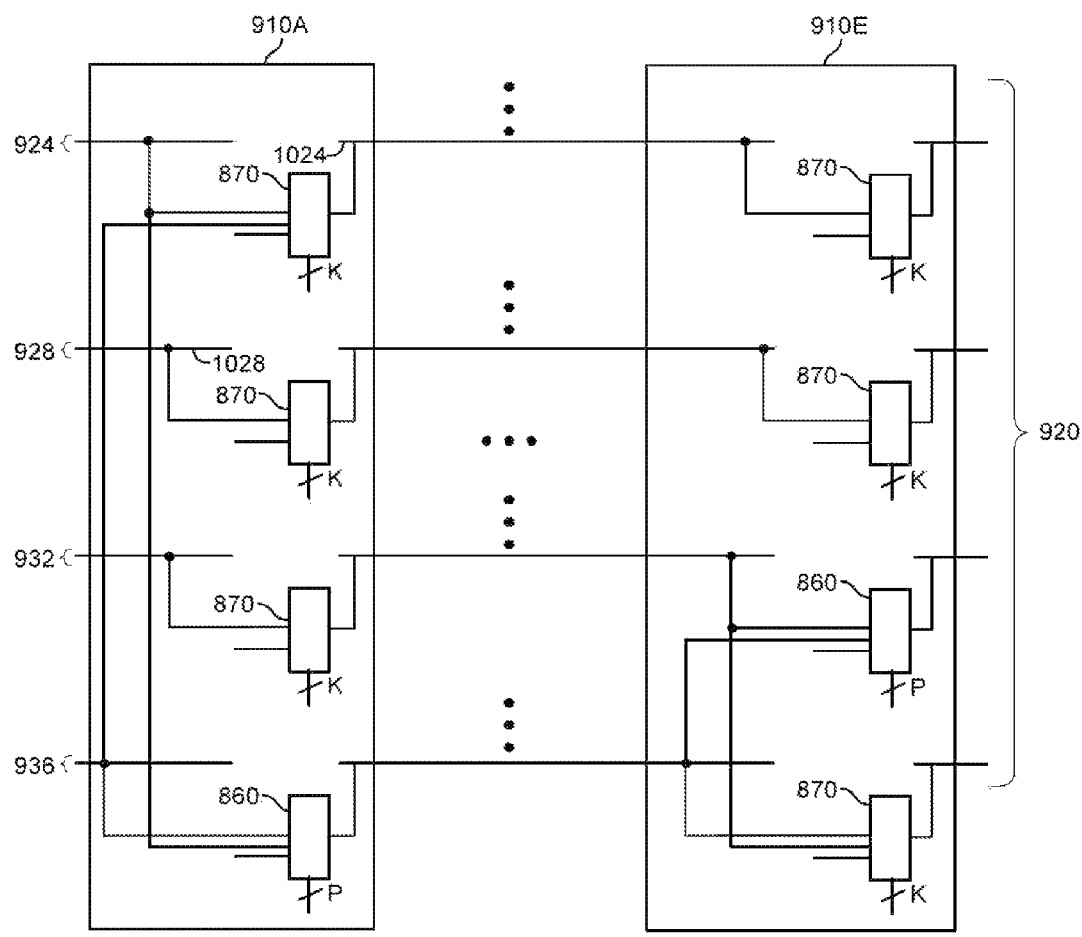
FIG. 11 is a diagram showing the illustrative routing channel of FIG. 9 with additional inputs into the pipelined routing resources to allow for wire switching between two wires within the routing channel in accordance with an embodiment of the present invention.

The embodiment of the routing architecture shown in FIG. 11 illustrates additional connections between horizontal tracks. FIG. 11 shows a horizontal routing channel 920 with pipelined routing resources. Similar to FIG. 9, horizontal routing channel 920 may include 16 horizontal tracks 921 to 936 with staggered routing wires or length four. Every functional block 910 may have four pipelined routing resources, each driving a wire in one of the 16 horizontal tracks.

Pipelined routing resources in functional blocks 910A and 910E drive wires in horizontal routing tracks 924, 928, 932, and 936. Every functional block may have one pipelined routing resource 860 and three pipelined routing resources 870. Pipelined routing resource 860 may have access to all P routing clocks by having a P:1 multiplexer in the second clock selection stage, while pipelined routing resource 870 only has access to a subset of K routing clocks by having a K:1 multiplexer in the second clock selection stage.

In addition, each pipelined routing resource with access to P routing clocks may have an extra input. This input may be connected to a wire that is driven by a pipelined routing resource with access to P routing clocks as well. For example, pipelined routing resource 860 which drives a wire in horizontal track 932 in functional block 910E may connect to a wire in horizontal track 932 driven by a pipelined routing resource 870 in functional block 910A. In addition, pipelined routing resource 860 may connect to a wire from horizontal routing track 936 which is driven by pipelined routing resource 860 in functional block 910A. Similarly, the pipelined routing resource 870 in functional block 910E which connects to a wire in horizontal track 936 may also have an additional input from which to select. This additional input may connect to a wire in horizontal track 932.

The configuration illustrated in FIG. 11 may enable signals to switch between horizontal routing tracks after each routing wire, thereby enabling the register pipelining of routing signals after every wire of length four, even if the register requires a clock signal from a routing clock which is not available in pipelined routing resources 870. In other words, a path requiring register pipelining after every wire of length four, whereby the register is synchronized to a clock signal which is available among the P routing clocks, but not accessible by any pipelined routing resource 870 may be implemented in this configuration. For this purpose, the signal may enter block 910A on horizontal routing track 924, arrive at pipelined routing resource 860, and be sent over horizontal routing track 936 to functional block 910E. The signal may enter functional block 910E on horizontal routing track 936, arrive at pipelined routing resource 860, and be sent over horizontal routing track 932 to the next functional block.

Figure 12:
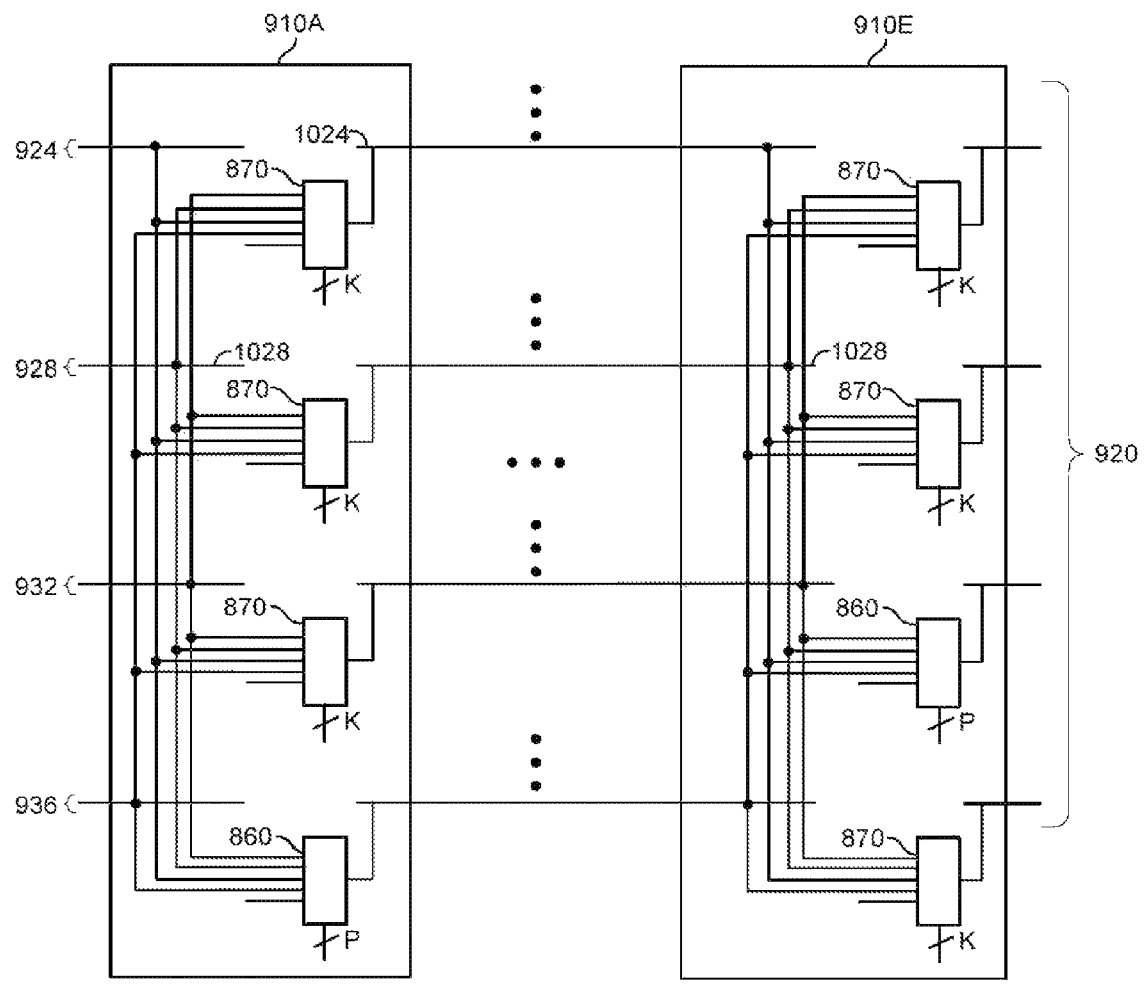
FIG. 12 is a diagram snowing the illustrative routing channel of FIG. 9 with additional inputs into the pipelined routing resources to allow for wire switching between any four wires within the routing channel in accordance with an embodiment of the present invention.

FIG. 12 shows a variation of the configuration illustrated in FIG. 11. As shown in FIG. 12, every pipelined routing resource 860 and 870 may connect to every horizontal routing track that ends in the given functional block, thereby providing an increased flexibility for switching signals between horizontal routing tracks. For example, a signal entering functional block 910A on horizontal routing track 924, 928, 932, or 936 may leave functional block 910A on either horizontal routing track 924, 928, 932, or 936.

Alternative variations of the configurations shown in FIG. 11 and FIG. 12 with different degrees of flexibility may be selected. For example, every pipelined routing resource 860 and 870 may connect to every other horizontal routing track that ends in the given functional block.

Figure 13:
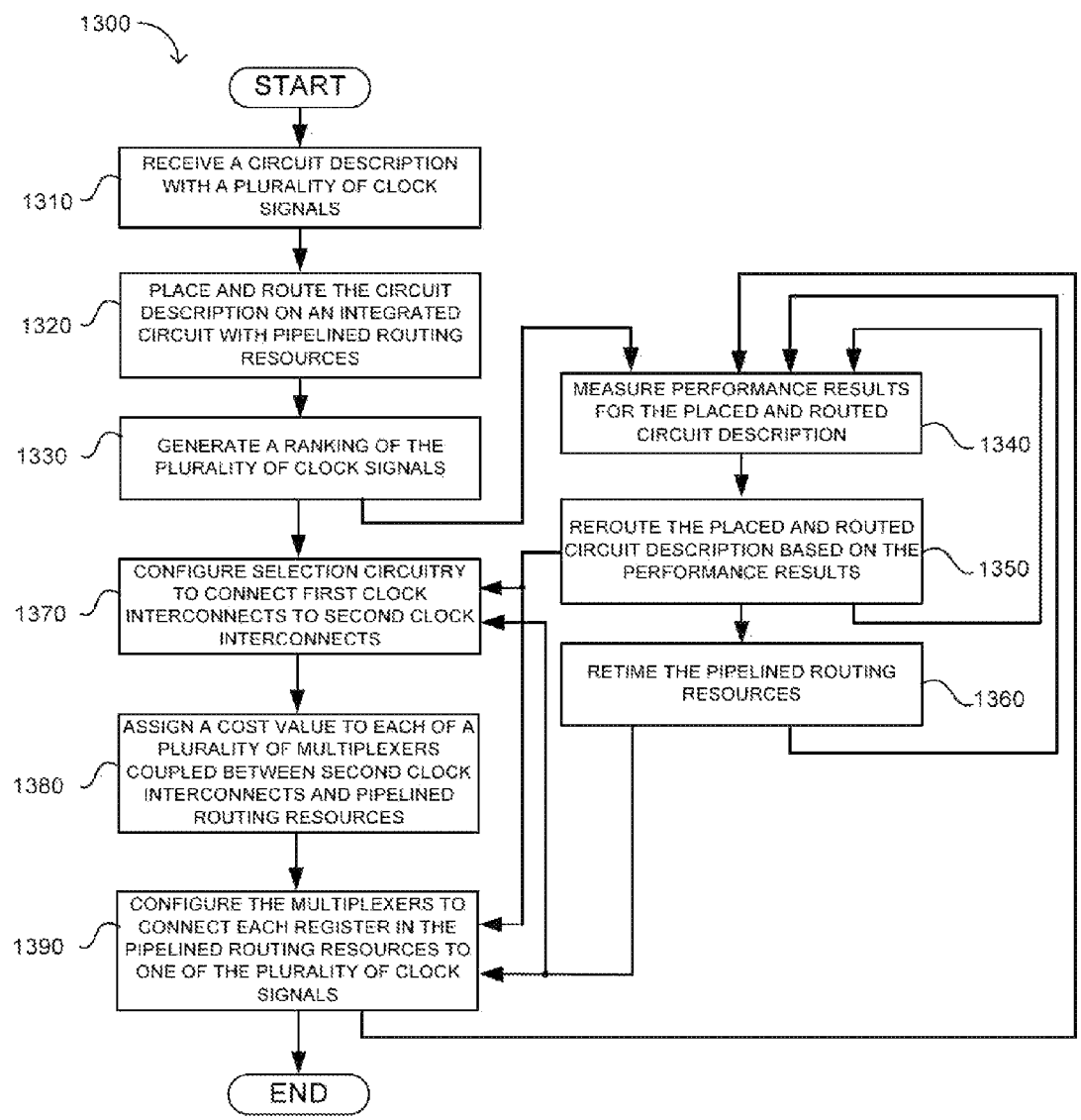
FIG. 13 is a flow chart showing illustrative steps for implementing a circuit description on an integrated circuit having pipelined routing resources and clock selection circuitry for pipelined routing resources in accordance with an embodiment of the present invention.

FIG. 13 is a flow chart showing illustrative steps of a method to implement a circuit description on an integrated circuit having pipelined routing resources (e.g., pipelined routing resources 200 or 300 in FIG. 3A or 3B) and clock selection circuitry (e.g., clock selection circuitry depicted in FIGS. 5-8) for pipelined routing resources.

During step 1310, a circuit description such as a gate-level description of the circuit to be implemented in an integrated circuit may be received. Several elements of the circuit description may be grouped together in an optional clustering step. For example, several gates of the gate-level description may be clustered to form macro-blocks. During step 1320, the circuit description may be placed and the placed circuit description may be routed using pipelined routing resources. The placement and routing steps may depend on the availability of routing clocks such as routing clocks 520, 620, 720, or 820 and the second clock selection stages in FIGS. 5, 6, 7, and 8, respectively. For example, placement may limit the number of clock signals entering a given region of the integrated circuit by assigning a cost to placing a sequential element inside a bounding box based on whether this sequential element requires an additional clock to be routed inside the bounding box.

During step 1330, a ranking of the plurality of clock signals in the clock selection circuitry may be generated. The ranking may be based on the number of sequential elements that each clock signal synchronizes, whereby the ranking may be from largest to smallest number or from smallest to largest number. The ranking may also be based on the number of uses of each clock signal in the pipelined routing resources. Alternatively, the ranking may be based on the frequency requirement of a clock signal or the criticality related to the clock signal (e.g., the timing slack or the relative timing slack or some other criticality or weighted criticality on paths that connect sequential elements that are synchronized by a given clock signal).

During step 1370, the first clock selection stage may be configured to connect region clocks such as region clocks 430 to routing clocks such as routing clocks 520, 620, 720, and 820 in FIGS. 5, 6, 7, and 8, respectively. The configuration may be based on the ranking of the plurality of clock signals determined during step 1330. For example, the first clock selection stage may select region clocks in decreasing order of the number of uses of that clock signal in pipelined routing resources.

During step 1380, a cost value may be assigned to each multiplexer of the second clock selection stage which is coupled between the routing clocks and the pipelined routing resources such as pipelined routing resources 510 in FIGS. 5, 6, 7, and 8. The cost may be based on the number of routing clocks that each respective multiplexer may select from. For example, a multiplexer that can access more routing clocks may be assigned a higher cost value than a multiplexer that can access less routing clocks.

During step 1390, the multiplexers of the second clock selection stage may be configured to connect each register in the pipelined routing resources to one clock signal in the routing clocks. The configuration of the multiplexers in the second clock selection stage with a lower cost value may be assigned first followed by the multiplexers with a higher cost value.

Additional optimization steps may be performed either after or before having determined an initial configuration of the clock selection circuitry. For this purpose, performance results may be measured for the placed and routed circuit description during step 1340. Based on these performance results, the placed and routed circuit description may be re-routed during step 1350. Re-routing may also take into account existing routing clocks. For example, re-routing may avoid using pipelined routing resources that don't already have a given clock signal available as a routing clock. Re-routing may also take into account the performance results to estimate the likelihood of each pipelined routing resource to actually use the pipeline register. Steps 1340 and 1350 may be executed iteratively until satisfactory performance results are measured.

During step 1360, the pipelined routing resources may be retimed. For instance, a pipelined routing resource in a given path that previously bypassed the pipeline register may be configured to use the register, while another pipelined routing resource that has previously used the pipeline register may be configured to bypass the register, thereby effectively retiming the pipelined routing resources. Steps 1340, 1350, and 1360 may also be executed iteratively.

Re-routing and retiming may require a reconfiguration of the clock selection circuitry, which may be performed by steps 1370, 1380, and 1390 as described above.

The method and apparatus described herein may be incorporated into any suitable electronic device or system of electronic devices. For example, the method and apparatus may be incorporated info numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using high-speed serial interface circuitry is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. Routing circuitry on an integrated circuit, comprising:
a plurality of pipelined programmable routing resources;
a first plurality of interconnects that conveys a first plurality of clock signals;
a second plurality of interconnects that conveys a second plurality of clock signals;
a first selector circuit coupled between the first and second plurality of interconnects, wherein the first selector circuit receives the first plurality of clock signals and selects among the received first plurality of clock signals to produce the second plurality of clock signals; and
a second selector circuit coupled to the second plurality of interconnects, wherein the second selector circuit receives from the second plurality of interconnects at least a portion of the second plurality of clock signals, selects a signal from the received portion of the second plurality of clock signals, and provides the selected signal to at least one of the pipelined programmable routing resources.

2. The routing circuitry of claim 1, wherein at least two interconnects in the second plurality of interconnects convey an identical signal.

3. The routing circuitry of claim 1, wherein the first selector circuit comprises a plurality of multiplexers, and wherein each multiplexer in the plurality of multiplexers produces a respective one of the second plurality of clock signals.

4. The routing circuitry of claim 1 further comprising:
a connection between one of the second plurality of interconnects and at least one other pipelined programmable routing resource in the plurality of the pipelined programmable routing resources, wherein the connection bypasses the second selector circuit.

5. The routing circuitry of claim 1 further comprising:
an additional multiplexer coupled to the second plurality of interconnects, wherein the additional multiplexer receives from the second plurality of interconnects at least a portion of the second plurality of clock signals, selects a signal from the received portion of the second plurality of clock signals, and provides the selected signal to at least one other pipelined programmable routing resource in the pipelined programmable routing resources.

6. The routing circuitry of claim 5, wherein the multiplexer is coupled to a first subset of interconnects in the second plurality of interconnects, and wherein the additional multiplexer is coupled to a second subset of interconnects in the second plurality of interconnects.

7. The routing circuitry of claim 6, wherein the first subset and the second subset are disjoint.

8. The routing circuitry of claim 6, wherein the first subset includes the second subset.

9. Configurable pipelined interconnect circuitry, comprising:
a routing channel having multiple wires;
a plurality of interconnects that convey clock signals;
a clock selection circuit coupled to the plurality of interconnects, wherein the clock selection circuit selects first and second subsets of clock signals;
a first pipelined routing circuit having first data inputs, first clock inputs, and a first output, wherein one of the first data inputs is coupled to a first wire in the multiple wires, wherein the first clock inputs are coupled to the clock selection circuit and receive the first subset of clock signals, and wherein the first output is coupled to a second wire in the multiple wires; and
a second pipelined routing circuit having second data inputs, second clock inputs, and a second output, wherein one of the second data inputs is coupled to a third wire in the multiple wires, wherein the second clock inputs are coupled to the clock selection circuit and receive the second subset of clock signals, and wherein the second output is coupled to a fourth wire in the multiple wires.

10. The circuitry of claim 9, wherein the first pipelined routing circuit comprises:
a first multiplexer having multiple inputs and an output, wherein each input of the multiple inputs is coupled to one of the first data inputs;
a register having an input, a clock port, and an output, wherein the output of the first multiplexer is coupled to the input of the register;
a second multiplexer having first and second inputs and an output, wherein the first input of the second multiplexer is coupled to the output of the first multiplexer, and the second input of the second multiplexer is coupled to the output of the register; and
an additional clock selection circuit coupled between the first clock inputs and the clock port of the register, wherein the additional clock selection circuit routes signals from a selected one of the first clock inputs to the clock pert of the register.

11. The circuitry of claim 9 further comprising:
a third pipelined routing circuit having third inputs, wherein an input of the third inputs is coupled to the second wire; and
a fourth pipelined routing circuit having fourth inputs, wherein an input or the fourth inputs is coupled to the fourth wire.

12. The circuitry of claim 11, wherein the fourth pipelined routing circuit has an additional input and wherein the additional input is coupled to the second wire.

13. The circuitry of claim 12, wherein the third pipelined routing circuit has another input and wherein the another input is coupled to the fourth wire.

14. The circuitry of claim 11, wherein the first subset of clock signals is a subset of the second subset of clock signals.

15. The circuitry of claim 14, wherein the third and fourth pipelined routing circuits further comprise third and fourth clock inputs, wherein the third clock inputs receive the second subset of clock signals, and wherein the fourth clock inputs receive the first subset of clock signals.

16. A method for using a design automation tool implemented on computing equipment to configure an integrated circuit having pipelined routing resources, wherein each pipelined routing resource on the integrated circuit includes a register and a multiplexer, wherein the multiplexer is configurable to select between first and second signals, and wherein the second signal is produced by storing the first signal in the register, the method comprising:
- receiving a circuit description having a plurality of clock signals and a plurality of clock selection circuits, wherein each clock selection circuit of the plurality of clock selection circuits is configurable to provide one of the plurality of clock signals;
- performing placement of the received circuit description;
- performing routing of the placed circuit description using the pipelined routing resources;
- configuring a first subset of the pipelined routing resources to select the first signal;
- configuring a second subset of the pipelined routing resources to select the second signal; and
- for each pipelined routing resource of the second subset of the pipelined routing resources, configuring one of the plurality of clock selection circuits to provide one of the plurality of clock signals to the register.

17. The method of claim 16, wherein configuring one of the plurality of clock selection circuits further comprises:
- defining a cost function for the plurality of clock signals;
- generating a ranking of the plurality of clock signals based on the cost function; and
- providing one of the plurality of clock signals to the register based on the ranking.

18. The method of claim 17, further comprising:
- obtaining performance results for the placed and routed circuit description.

19. The method of claim 18, wherein the cost function is based on the performance results of the placed and routed circuit description.

20. The method of claim 18, further comprising:
- rerouting the placed and routed circuit description using the pipelined routing resources based on the performance results;
- configuring a third subset of pipelined routing resources to select the first signal;
- configuring a fourth subset of pipelined routing resources to select the second signal; and
- for each pipelined routing resource of the fourth subset of pipelined routing resources, configuring one of the plurality of clock selection circuits to provide one of the plurality of clock signals to the register.

21. The method of claim 18, further comprising;
- retiming the pipelined routing resources by configuring a routing resource of the first subset of pipelined routing resources to select the second signal based on the placed and routed circuit description and the performance results; and
- providing one of the plurality of clock signals to the register in the routing resource based on the retimed circuit description.

22. The method of claim 18, further comprising:
- retiming the pipelined routing resources by configuring one of the second subset of pipelined routing resources to select the first signal based on the placed and routed circuit description and the performance results.

23. The method of claim 16, wherein the one of the plurality of clock selection circuits includes first and second pluralities of clock interconnects and selection circuitry coupled between the first and second plurality of clock interconnects, wherein the plurality of clock signals is assigned to the first plurality of clock interconnects, and wherein configuring the one of the plurality of clock selection circuits further comprises:
- generating a ranking of the plurality of clock signals based on a number of uses of the clock signal; and
- with the selection circuitry, connecting interconnects in the first plurality of clock interconnects to interconnects in the second plurality of clock interconnects based on the ranking.

24. The method of claim 23, wherein the one of the plurality of clock selection circuits further includes an additional multiplexer having a number of inputs and an output, wherein the additional multiplexer is coupled between the second plurality of clock interconnects and the register in one of the pipelined routing resources, and wherein configuring the one of the plurality of clock selection circuits further comprises:
- assigning a cost to the multiplexer based on the number of inputs; and
- configuring the multiplexer to connect the register in one of the pipelined routing resources with one of the second plurality of clock interconnects based on the assigned cost.

* * * * *